United States Patent [19]

Barnett

[11] 4,272,235
[45] Jun. 9, 1981

[54] METHOD AND APPARATUS FOR FOLDING AND SEALING A FLOPPY DISC ENVELOPE

[75] Inventor: David L. Barnett, Phoenix, Ariz.

[73] Assignee: Three Phoenix Company, Phoenix, Ariz.

[21] Appl. No.: 963,451

[22] Filed: Nov. 24, 1978

[51] Int. Cl.³ .............................................. B29C 17/02
[52] U.S. Cl. ..................................... 425/397; 156/443
[58] Field of Search .......................... 425/397; 53/206; 156/443, 196, 217, 227

[56] References Cited

U.S. PATENT DOCUMENTS

| 3,389,532 | 6/1968 | Stelzer | 53/206 X |
| 3,685,249 | 8/1972 | Jackson | 53/206 X |
| 3,929,547 | 12/1975 | Paccagnella | 156/443 |
| 3,963,548 | 6/1976 | George | 156/443 X |

Primary Examiner—Thomas P. Pavelko
Attorney, Agent, or Firm—Cahill, Sutton & Thomas

[57] ABSTRACT

A center fold is produced in a floppy disc envelope by partially folding a pre-cut sheet of polyvinyl chloride (PVC) having two spaced center holes. The center holes are forced over a precision pedestal affixed to a flat support surface. A first fold bar is lowered against the partially folded sheet, flattening first and second sections of the sheet on each side of a fold line against the support surface, producing a fold of controlled radius. A heat lamp is utilized to anneal the fold for a predetermined time, after which the fold bar is raised. A flap extending from the first section of the sheet is folded back against the second section of the sheet by means of an apparatus including a flat support, a precision pedestal for aligning and retaining the partially folded envelope, and a second fold bar having a lip for engaging the edge of the flap. The second fold bar moves along an arcuate path controlled by a four bar linkage, folding the flap back against the second section and simultaneously forcing the fold end of the flap against a resilient pad adjacent a rigid stop attached to the support surface, producing a permanent end fold having a controlled radius of curvature. The folded flap is then sealed by means of an apparatus including a clamp bar, a heat lamp, and a movable hot sealing bar. After the envelope is aligned, the clamp bar engages the flap adjacent the end fold and forces the flap against the envelope. The heat lamp is turned on, annealing the fold. The hot sealing bar is forced against the free end of the flap, welding the end of the flap to the envelope.

10 Claims, 15 Drawing Figures

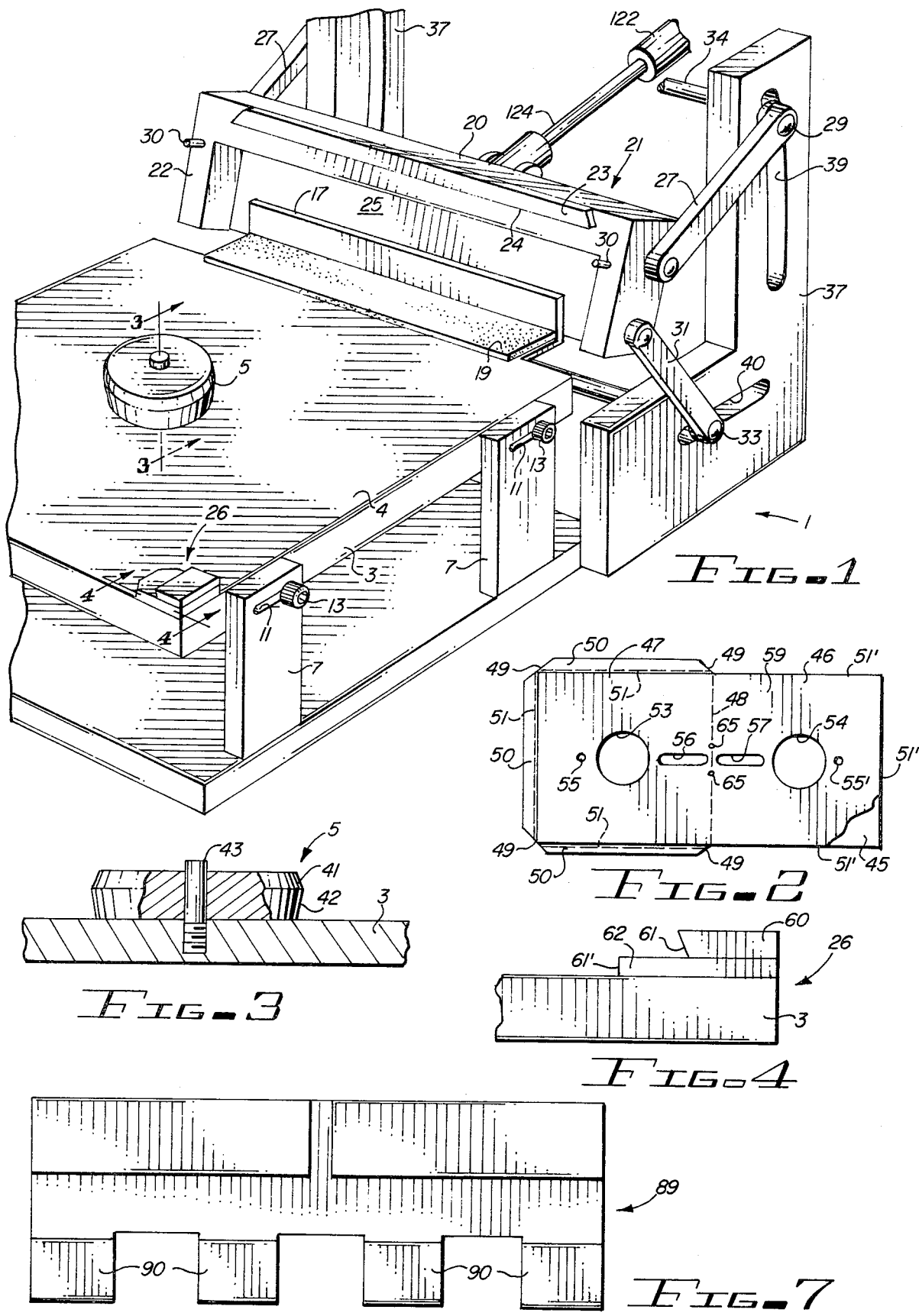

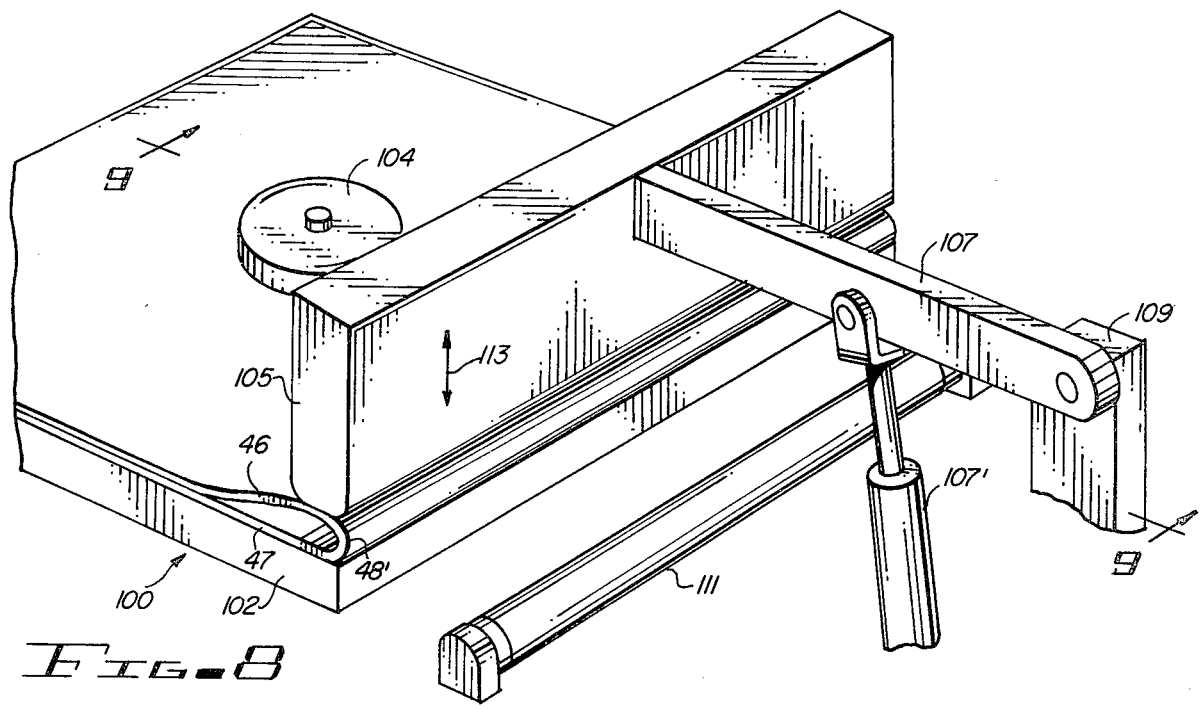
FIG.-8
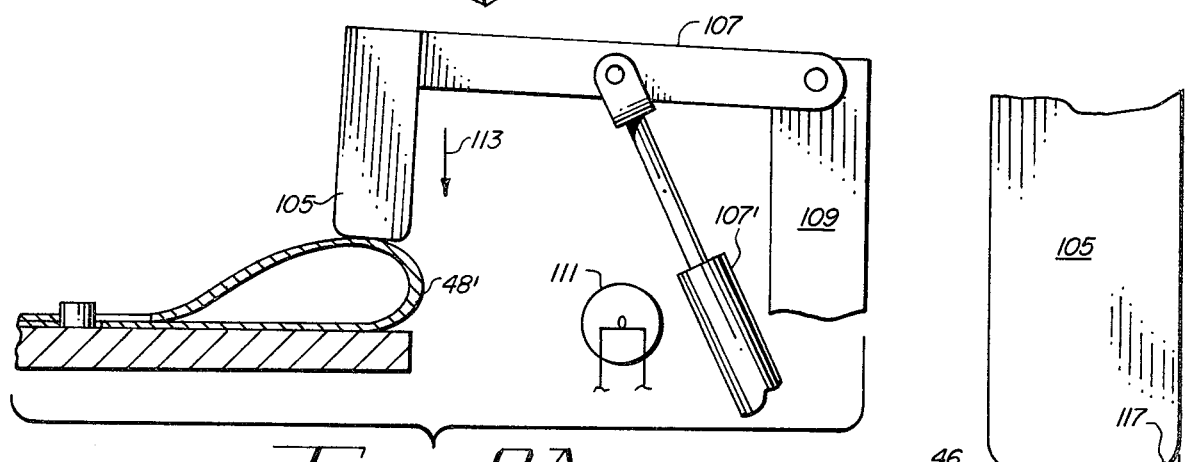
FIG.-9A
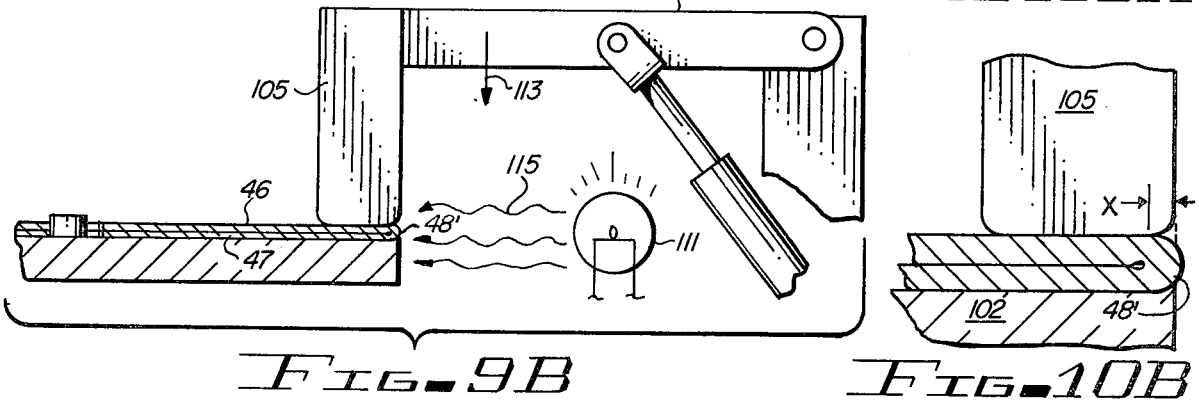
FIG.-9B
FIG.-10A
FIG.-10B

METHOD AND APPARATUS FOR FOLDING AND SEALING A FLOPPY DISC ENVELOPE

BACKGROUND OF THE INVENTION

1. Field of the Invention

The invention relates to apparatus and methods for folding and sealing floppy disc envelopes.

2. Description of the Prior Art

Foppy discs are flexible annular recording discs which are widely used for off-line data storage in data processing systems due to their lightweight, relatively low cost, and convenience of use. Floppy discs, which are described in more detail in a co-pending application entitled "Improved Method and Apparatus for Burnishing Floppy Discs", Ser. No. 885,625, filed on Mar. 13, 1978, invented by the present inventor and incorporated herein by reference, are permanently sealed in floppy disc envelopes, hereinafter referred to as simply envelopes, prior to use. The envelopes are formed from sheets of flexible polyvinyl chloride. A floppy disc envelope has aligned center or drive holes which permit a floppy disc transport system to engage the floppy disc enclosed within the envelope and rotate the floppy disc between layers of a low friction liner with which the envelope is lined. The envelope also includes slots which permit electro-optical synchronization of the floppy disc transport system with rotation of the floppy disc and also permits magnetic read/write heads of the floppy disc machine to contact a rotating floppy disc.

The floppy disc envelopes are formed from precut sheets of polyvinyl chloride which include the necessary center holes, alignment holes, and magnetic head slots. Half of a pre-cut sheet is rectangular. The other half is identical, except that it includes three flaps which extend from its three outer edges. The low friction liner is attached to the inner surface of the sheet prior to pre-cutting it. A center fold having a predetermined fold radius is formed by folding each half of the sheet against the other half. The side flaps are then folded around the edges of the opposite half of the sheet and are sealed thereto. A floppy disc is then inserted between the low friction liner layer attached to the inner surface of the two halves or sectitons of the sheet and the end flap is then folded to complete assembly of a floppy disc and envelope unit, hereinafter referred to as a floppy disc unit.

In the past, the known techniques for folding and sealing the envelopes have been problematic. The four required folds must be very precise in order that torque specifications for the floppy disc unit remains within predetermined specifications. If the folds are too "sharp", the pressure of the low friction liner against an enclosed rotating floppy disc will increase the torque required by the floppy disc drive system. Similarly, warpage of the completed floppy disc unit must be kept within tight tolerances established by users of floppy disc systems. Unfortunately, it has been difficult to provide the required precise folds in polyvinyl chloride sheets necessary to avoid unacceptable warpage of the completed floppy disc units to the extent required to obtain high manufacturing yields. In the past it has been necessary to heat the polyvinyl chloride sheets at the fold locations prior to bending of the sheets. One known way of accomplishing the heating and bending operations involves use of a thin heated rod about which the polyvinyl chloride sheet is bent. However, polyvinyl chloride sheets of the required thickness have a great tendency to warp when heated above about approximately 130° F. Consequently, warpage of floppy disc envelopes in excess of permissible specifications has been frequent. Consequently, manufacturing yields have been undesirably low, increasing costs and reducing profitability.

Accordingly, it is an object of the invention to provide precise folds in polyvinyl chloride sheets while minimizing warpage therein.

Another object of the invention is to provide precise folds in polyvinyl chloride sheets without the necessity of preheating any of the polyvinyl chloride material prior to bending of the polyvinyl chloride sheets.

Yet another object of the invention is to provide a method and apparatus for folding floppy disc envelopes without causing unacceptably high warpage of the envelopes and without producing stresses which substantially warp the envelopes, increasing friction between a liner of the floppy disc envelope and an enclosed floppy disc to an unacceptable level.

SUMMARY OF THE INVENTION

Briefly described and in accordance with one embodiment thereof, the invention provides apparatus and method for folding floppy disc envelopes, wherein a precut sheet of flexible plastic such as polyvinyl chloride, which sheet has been folded along a center fold line, is aligned and positionally retained on a support. The sheet has first and second sections on opposite sides of the center fold line. The first section has a flap extending therefrom and an end fold line between the first section and the end flap, along which end fold line the flap is to be folded. The flap is to be also folded around a corresponding edge of the second section, the corresponding edge being aligned with the end fold line. The edge of the flap is engaged and moved along an arcuate path past the folded sections, the arcuate path having curvature such that (1) the flap is folded or bent about the end fold line around the aligned edge of the first section, and (2) the material of the flap near the end fold line is forced against (i) a rigid stop attached to the support, and (ii) the surface of the second section of the sheet. A thin resilient pad is attached to the support and abuts the resilient stop, so that the material near the fold line is also forced against the resilient pad as the end of the flap moves along the arcuate path. The edge of the flap is moved along the arcuate path by means of a four bar linkage system including a fold bar having first and second ends and first and second opposed edges. A lip attached to the fold bar adjacent the first edge of the fold bar engages the edge of the flap. Upper and lower linkage members are pivotally attached to the first end of the fold bar adjacent its first and second edges, respectively. Corresponding upper and lower linkage members are similarly pivotally attached to the second end of the fold bar. The upper and lower linkage members have their opposite ends pivotally attached to first and second fixed points, respectively, of a support. The locations of the first and second fixed points are selected to cause the lip to move along the arcuate path as the fold bar is rotated. As the edge of the flap moves along a portion of the arcuate path extending close to the second section of the sheet, the portion of the fold bar adjacent the second edge forces the material of the flap tightly against the second section of the sheet, causing the elastic limit of the flexible plastic along the end fold line to be exceeded, causing a permanent end fold to be formed along the end fold line. The radius of curvature of the end fold is determined partially by the thickness and resiliency of the resilient pad. The foregoing end folding procedure can be accomplished without heating of the sheet material.

The above mentioned center fold initially formed in the sheet is produced by folding the second section against the first section, aligning the first section with the second section and pressing the material of the first and second sections adjacent the center fold line together, reducing the radius of curvature of the center fold. A small portion of the fold extends beyond a second fold bar and a support between which the material of the two sections adjacent the center fold line is squeezed. A predetermined amount of radiant heat is directed at the extending portion of the fold to raise the temperature of the material therein to a predetermined temperature in order to anneal the extending portion of the fold sufficiently to reduce internal stresses therein. The second fold bar is then removed. After the end folds have been produced, the flaps are sealed against the material of the second section by pressing heated sealing elements against preselected points of the flap to cause welding of the flap to the second section of the sheet. A predetermined amount of radiant heat is directed at the material along the end fold line to anneal it, thereby relieving any internal stresses therein. Both of the above mentioned annealing steps relieve internal stresses which would otherwise tend to cause warpage of the floppy disc envelope and would not yield the upper radius of curvature.

BRIEF DESCRIPTION OF THE DRAWINGS

FIG. 1 is a partial perspective view of an end fold machine for folding flaps of floppy disc envelopes.

FIG. 2 is a plan view of a pre-cut sheet of flexible plastic from which a floppy disc envelope is made.

FIG. 3 is a partial section view taken along section lines 3—3 of FIG. 1.

FIG. 4 is a partial section view taken along section lines 4—4 of FIG. 1.

FIG. 7 is a partial front view illustrating the heating fingers of the machine of FIG. 7.

FIG. 8 is a partial perspective view of a machine utilized to produce a center fold of a floppy disc envelope.

FIGS. 9A and 9B illustrate sequential steps in the operation of the machine of FIG. 8.

FIGS. 10A and 10B are useful in describing formation of a center fold produced by the machine of FIG. 8.

DESCRIPTION OF THE INVENTION

Figure 5A:
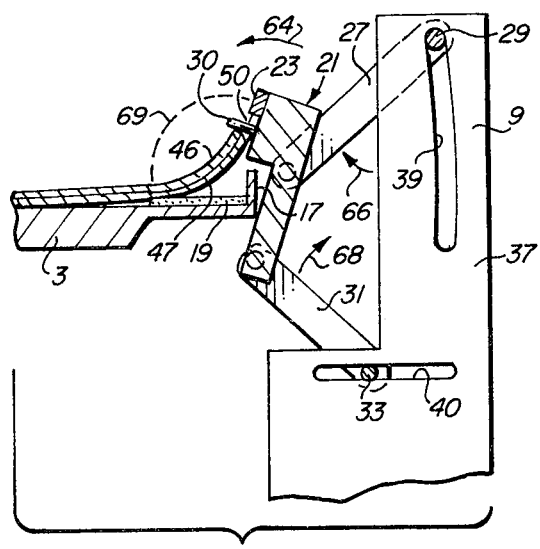
FIGS. 5A–5D illustrate a sequence of operating configurations useful in describing the operation of the machine of FIG. 1.

The basic sequence of steps previously referred for making a floppy disc envelope include forming a permanent center fold in a pre-cut sheet of polyvinyl chloride (PVC) lined with a low friction liner, inserting a floppy disc between the layers of the low friction liner, folding extending flaps from one section of the pre-cut sheet around corresponding edges of a second section of the pre-cut PVC sheet, and sealing the bent flaps against the surface of the second PVC sheet.

The apparatus and method of the present invention can be best understood by first describing the pre-cut sheet of polyvinyl chloride in detail and then describing the apparatus and operation thereof to perform the above described basic steps in the sequence in which such steps are performed.

Referring now to FIG. 2, a plan view of pre-cut PVC sheet 45 is shown. The thickness of sheet 45 is approximately fifteen mils. Sheet 45 includes a first section 47 and a second section 46 separated by a center fold line 48. Center holes 53 and 54 are centerally positioned in sections 47 and 46, respectively. Center holes 53 and 54 are of identical diameter, and permit a floppy disc transport system to contact a floppy disc enclosed in a floppy disc envelope formed from sheet 45 and spin the floppy disc between layers of low friction liner designated by reference numeral 59. Low friction liner 59 is a proprietary paper towel-like material, approximately ten mils thick and believed to be manufactured by Kentex Corporation. Elongated slots 56 and 57 are symmetrically disposed about center fold line 48, and permit magnetic read/write heads to contact the magnetic surface of the rotating floppy disc enclosed within an envelope formed from sheet 45. Small holes 55 and 56 are symmetrically disposed in sections 47 and 46 about center fold line 48 and permit electro-optical sensing of angular rotation rate and position of a rotating enclosed floppy disc, which has corresponding holes therein. Small round holes 65 in sheet 45 along center fold line 48 are stress relief holes.

Section 47 has three flaps 50 which extend outwardly as shown. Each flap 50 is subsequently folded along a corresponding end fold line 51, which fold line is aligned with a corresponding edge 51' of section 46 when sections 46 and 47 are folded together about center fold line 48. The side edges of each flap 50 are angled, as indicated by diagonal lines 49.

Referring now to FIG. 8, the apparatus and method of folding sections 46 and 47 about center fold line 48 will be described. Center fold machine 100 includes a flat support plate 102 having a circular center post 104 mounted thereon. Pre-cut sheet 45 is partially folded by slipping hole 53 of section 47 over post 104 and then slipping hole 54 of section 46 also over post 104, with low friction liner 59 sandwiched between sections 46 and 47. The clearance between holes 53 and 54 and post 104 is sufficiently small (approximately five mils) that the partially folded sheet 45 is snugly held in the configuration shown in FIG. 8. Reference numeral 48' in FIG. 8 illustrates the partial, large radius of curvature of a fold about center fold line 48 of FIG. 2.

Center fold machine 100 further includes a fold bar 105 which can be vertically raised and lowered in the directions indicated by arrow 113 so that the flat lower surface of fold bar 105 presses upper section 46 and lower section 47 of sheet 45 together against the flat upper surface of support plate 102, decreasing the radius of curvature of end fold 48', causing the elastic limit of the polyvinyl chloride material along end fold line 48 to be exceeded, and producing a permanent small radius fold along center fold line 48, as illustrated in FIGS. 9A, 9B, 10A, and 10B.

Center fold apparatus 100 also includes a support arm 107 rigidly attached to fold bar 105 and pivotally connected to a rigid support 109. An air cylinder 107' operates under control of a control system (not shown) lowers fold bar 105, producing a predetermined downward force of approximately several pounds against sheet 45 during the folding process.

Center fold apparatus 100 also includes an eight inch tubular quartz iodine lamp positioned roughly three inches from and parallel to center fold 48'. Lamp 111 can be an 800 watt model QH800Te, manufactured by General Electric.

FIGS. 9A and 9B illustrate the sequence of operations as fold bar 105 is lowered against upper section 46 of sheet 45, flattening it against lower section 47, as shown in FIG. 9B, and producing a small radius centerfold 48'. While fold bar 105 is being held against upper section 46, as shown in FIG. 9B, quartz iodine lamp 111 is illuminated, causing heat energy designated at arrows 115 to be directed at end fold 48', thereby causing the polyvinyl chloride material in end fold 48' to be raised to a temperature of approximately 150° F. This temperature has been found to allow internal stresses in the polyvinyl chloride to be relieved so that the proper radius of curvature can be obtained. It has been found that annealing at that temperature for a period in the range from four to ten seconds provides satisfactory results if the edge of fold bar 105 has a curved lower edge 117 (as shown in FIG. 10A) such that the distance x indicated in FIG. 10B is approximately 50 mils.

The above 50 mil distance permits the polyvinyl chloride material in center fold 48' to reach approximately 150° F. by preventing fold bar 105 from "sinking" from the material in center fold 48' at such a high rate that its temperature does not reach approximately 150° F. However, the heating is confined to the small radius fold portion 48'. This is desirable because intermediate temperatures of roughly 130° F. in the remaining portions of sections 46 and 47 of sheet 45 are thereby avoided in such remaining portions and consequent warpage of the envelope, which warpage would result from such intermediate temperatures, is also avoided.

The nominal radius of curvature of the center fold 48' produced by the foregoing apparatus and method of operation is 31 mils.

Referring now to FIG. 1, end fold machine 1, which is utilized for folding flaps 50 about end fold lines 51 and around corresponding edges 51' of section 46 of sheet 45 (after sheet 45 has been "center folded" as described above) includes a support plate 3 having a flat surface 4. Support plate 3 is adjustably supported on posts 7, which in turn are rigidly connected to base 9. Lateral adjustment of support plate 3 can be accomplished by means of bolts 13 and slots 11 in posts 7.

Center post having beveled edges (and shown in more detail in FIG. 3), is rigidly attached to surface 4 of support plate 3. Center holes 53 and 54 of folded sheet 46, 47 can be pressed over the beveled edges of center post 5.

A pair of alignment guides 26 (shown in more detail in FIG. 4) are attached to opposite front corners of surface 4 to engage edges of flaps 50 and edges of folded sheet 45 during the subsequently described "end folding" process, wherein the flaps 50 are folded about end fold lines 51.

A rigid stop 17 is attached to the rear end of support plate 3 and has a surface co-planar with surface 4 of support plate 3. A thin (approximately ⅛ of an inch thick) resilient pad 19 is attached to surface 4 and the co-planar surface of rigid stop 17, as shown in FIG. 1. In the present embodiment of the invention, a 25 Durometer rating for resilient pad 19 has been found to provide a suitable radius of curvature (approximately 36 mils) for the end folds of a floppy disc envelope.

End fold machine 1 includes a fold bar 21 pivotally attached by means of a pair of upper linkage arms 27 and a pair of lower linkage arms 31 to a pair of rigid frame elements or supports 37. Those skilled in the art will recognize that the illustrated mechanism is a four bar linkage. Fold bar 21 includes a thin lip 23 attached to flat surface or pressing means 22 of fold bar 21 adjacent outer edge 20 thereof. Lip 23 has an inner edge or first engaging means 24 for engaging an outer edge of flap 50 of a folded sheet 46, 47 properly positioned on surface 4. An air cylinder assembly 122, 124 is hingeably attached to the rear side of fold bar 21 to rotate fold bar 21, after folded floppy disc envelope 46, 47 has been positioned on center post 5 (and aligned by means of guides 26) as partially shown in FIGS. 5A–5D. Since upper and lower linkage members 27 and 31 are pivotally connected to support frames 37 and fold bar 21 (by means of bolts 28, 29, 32 and 33, respectively) rotation of fold bar 21 causes inner edge 24 of lip 23 to move along variable radius arcuate path 69, as shown in FIGS. 5A–5D.

It should be noted that a pair of spring loaded retaining means or pegs 30 are disposed in fold bar 21 along the outer corners of surface 22 of fold bar 21. When fold bar 21 has been rotated sufficiently far counterclockwise that flat surface 22 is horizontal, pressing flap 50 flat against the upper surface of section 46 of folded sheet 46, 47, spring loaded pegs 30 are pushed upward into recesses (not shown) of fold bar 21. However, when spring loaded pegs 30 are extended (as in FIG. 1 and FIGS. 5A–5C), an outer edge 51' of sheet section 46 is retained by spring loaded pegs 30, while diagonals 49 permit the outer edge of the flap 50 being folded to be engaged by edge 24 of lip 23, as can be seen by careful examination of FIG. 5A, so that flap 50 can be folded around edge 51' as the outer edge of flap 50 moves along arcuate path 69.

Figure 5B:
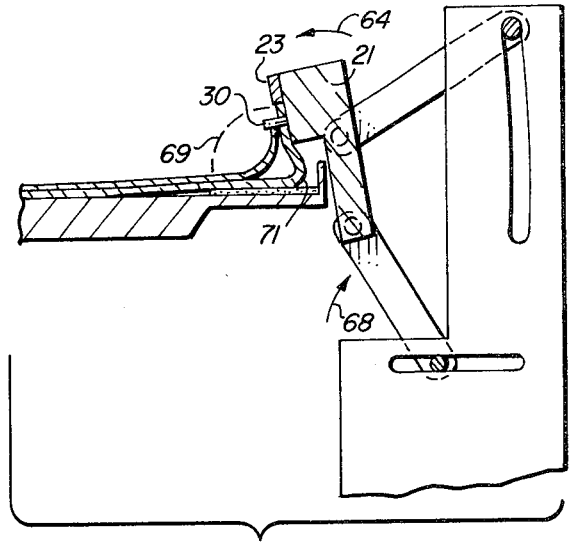
Figure 5C:
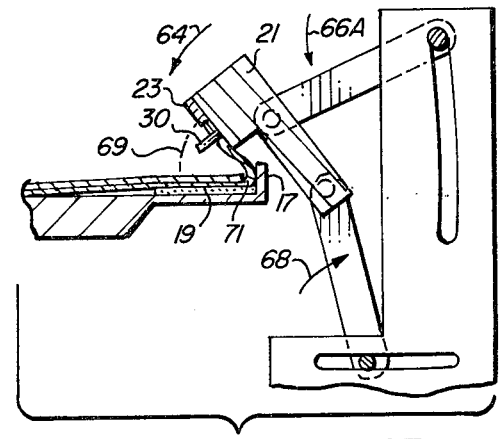
Figure 5D:
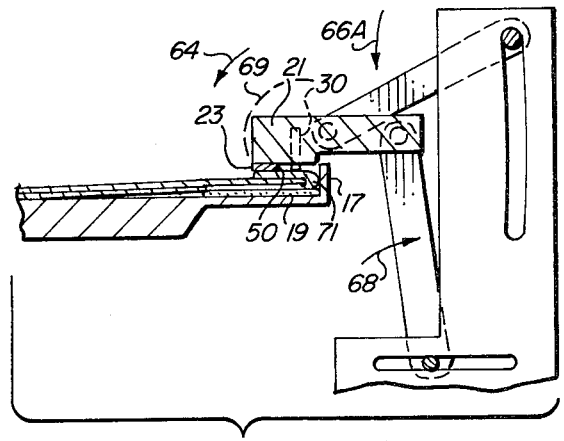

The manner in which upper and lower linkage members 27 and 31, frame supports 37, and fold bar 21 cooperate to produce arcuate variable radius path 69 is best understood by careful reference to FIGS. 5A–5D, which illustrate four configurations of the above elements as fold bar 21 is rotated from an initial position shown in FIG. 5A counterclockwise in the direction indicated by arrow 64 to a final maximum counterclockwise position shown in FIG. 5D to fold or bend flap 50 about end fold line 51 and around a corresponding edge 51' of section 46 of folded sheet 46, 47.

It can be seen that the initial direction of arcuate path 69 tends to be upward and to the left in FIG. 5A prior to the time that edge 24 of lip 23 reaches its zenith. Up to that point, upper linkage member 27 rotates clockwise, as indicated by arrow 66, and lower linkage element 31 rotates clockwise, as indicated by reference numeral 68. Since folded sheet 46, 47 is braced against center post 5, and since the outer edge of flap 50 is being pushed to the left, as fold bar 21 continues to rotate counterclockwise, a fold designated by reference numeral 71 begins to appear, as shown in FIG. 5B. As fold bar 21 continues clockwise rotation, upper linkage member 27 begins to rotate counterclockwise, as indicated in FIG. 5C, and lower linkage member 68 continues rotating counterclockwise, causing arcuate path 69 to curve downward and to the right, as shown in FIGS. 5A–5D. This motion tends to cause the material near fold line 51 to be gathered or "bunched up" and be forced to the right against rigid stop 17 and downward against resilient pad 19. (It should be noted that fold bar 21 has a recess 25 into which the upper portion of rigid stop 17 extends during the rotation of fold bar 21.) These forces tend to produce a relatively sharp or small radius curvature of polyvinyl chloride sheet 46, 47 about end fold line 51 (FIG. 2). As rotation of fold bar 21 in the counterclockwise direction continues, flat surface 22 presses nearly all of the material of flap 50 tightly against the material of lower sheet section 47, as shown in FIG. 5D, causing the elastic limit of the polyvinyl chloride material along end fold line 51 to be exceeded, producing a permanent end fold 71 thereat. The radius of curvature of the permanent bend has been found to be partially determined by the thickness and Durometer rating of resilient pad 19. In the presently preferred embodiment of the invention, the radius of curvature of the completed end fold 71 is approximately 36 mils. It should be noted that the exact position of support plate 3, rigid stop 17, and the curvature of arcuate path 69 also contribute to the desired radius of curvature of fold 71.

It can be seen that the curvature of arcuate path 69 can be controlled by adjusting the positions of bolts 29 and 33 in slots 39 and 40, respectively. These positions are adjusted by means of "T-shaped" elements (not shown) which are positionally adjusted in slots 39 and 40 and are locked into preadjusted positions. Those skilled in the art can readily provide a variety of techniques for adjusting the locations of bolts 29 and 33 with respect to slots 39 and 40.

After the sequence illustrated in FIGS. 5A–5D has been completed, fold bar 21 is rotated clockwise back to its initial position (as shown in FIG. 5A) by air cylinder assembly 122, 124. The folded sheet 46, 47 can then be reoriented on center post 5 so that another flap edge is engaged by edge 24 of lip 23, and the above described process can be repeated.

It should be noted that the beveled edges of center post 5 of FIG. 1 are slanted, as shown in the sectional view of FIG. 3. Referring now to FIG. 3, it is seen that center post 5 is securely attached to support plate 3 by means of bolt 43, which is threaded into a pre-existing hole in support plate 3. The upper portion of the beveled edge 41 is sloped to permit convenient sliding of holes 53 and 54 of folded sheet 46, 47 over center post 5. The lower edges 42 of center post 5 are sloped inward to prevent the folded sheet 46, 47 from slipping off of center post 5 as fold bar 21 is rotated counterclockwise, as described above, with reference to FIGS. 5A–5D.

It will be convenient to describe alignment guides 26 of FIGS. 1 and 4 in more detail at this point. Referring partially to FIG. 4, it is seen that alignment guide 26 includes a lower plate 62 having a vertical inner edge 61' and an upper plate 60 having an inwardly sloped edge 61. Sloped edge 61 performs the function of aligning a folded sheet 46, 47 by engaging an outer edge of an unfolded flap 50; the inward slope prevents upward slipping of the edge of the unfolded flap 50. The vertical edge 61' performs the function of aligning a folded sheet 46, 47 by engaging a folded edge of the folded sheet 46, 47.

Figure 6:
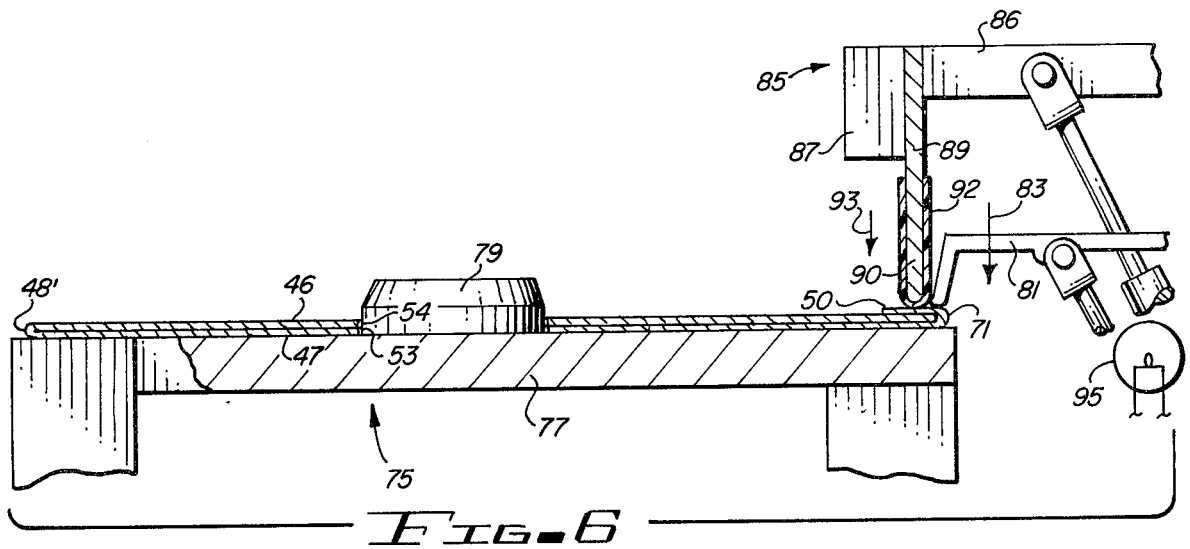
FIG. 6 is a partial end view of a machine for sealing flaps during manufacturing of a floppy disc envelope.

After all of the flaps 50 of a particular floppy disc envelope have been folded as described above by means of end folder machine 1, the three flaps 50 of the floppy disc envelope need to be sealed or welded to the adjacent outer surface of section 46 of the floppy disc envelope. The sealing/annealing machine 75 of FIG. 6 performs the required sealing and annealing functions. Referring now to FIG. 6, machine 75 includes a flat support plate 77 having a center post 79. Floppy disc envelope 46, 47 is aligned and positioned on the upper surface of support plate 77, with aligned holes 53 and 54 fitting over center post 79, as illustrated. Sealing/annealing apparatus 75 includes a clamp bar 81 which is lowered in the direction indicated by arrow 83 to push flap 50 immediately adjacent fold 71 against the upper surface of section 46. This step is necessary because at the completion of the above described end folding procedure when fold plate 21 of end folding machine 1 is initially rotated counterclockwise, flap 50 springs upward from its folded position so that it is inclined at approximately 45° with respect to the plane of sheet section 46.

Sealing/annealing device 75 further includes a quartz iodine lamp 95 similar or identical to lamp 111 of FIG. 8, and also includes a sealing system 85 supported on a pivotable arm 86 and a heating element 87 and a heat conducting aluminum plate 89 rigidly mounted to arm 86. As shown in FIG. 7, heat conducting plate 89 has a plurality of fingers 90 which extend downward. The temperature of heating element 87 is controlled such that the temperature of the lower ends of fingers 90 is approximately 250° F. plus or minus approximately 15°. Each of the fingers 90 is covered by a thin layer of Teflon impregnated fiberglass to prevent the polyvinyl chloride material of flaps 50 from sticking to the ends of fingers 90 which contact flap 50.

After clamp bar 81 has been lowered, as described above, arm 86 is lowered to push against flap 50 with a predetermined force of approximately several pounds, as indicated by arrow 93. Simultaneously, lamp 95 is turned on, and directs heat at fold 71 in a manner similar to that described above with respect to lamp 111 of FIG. 8. This causes annealing of the polyvinyl chloride material adjacent the appropriate end fold line 51 and comprising fold 71, thereby reducing internal stresses caused by the cold folding process described with reference to end fold machine 1. After approximately three to five seconds, anneal bar 86 is raised. After lamp 95 has been on for approximately four to ten seconds, lamp 95 is turned off. After several additional seconds, clamp bar 83 is raised, completing the manufacture of the composite floppy disc/floppy disc envelope unit.

Floppy disc units manufactured in accordance with the above described apparatus and procedure have been found to have a very high yield with respect to envelope warpage and floppy disc drive torque. The above described apparatus is relatively inexpensive, and is highly reliable, due mainly to its basic overall simplicity. The above described apparatus is easily adjustable to accommodate slight variations in characteristics of the polyvinyl chloride material utilized. The principles embodied in the above described apparatus are readily adaptable to more complex apparatus having automatic handling features for manipulating a pre-cut sheet of polyvinyl chloride so that minimum or no handling is required.

Those skilled in the art will recognize that variations in the above described apparatus readily may be made within the true scope and spirit of the present invention. The invention is therefore to be limited only by referring to the appended claims.

I claim:

1. Apparatus for making a floppy disc envelope form a sheet of flexible plastic, the sheet having first and second opposed surfaces, first and second sections on opposed sides of a center fold line, first and second floppy disc drive holes which are aligned when the sheet is folded, a plurality of slots for permitting a magnetic head to contact an enclosed floppy disc, and a liner attached to the first surface of the sheet, the second section of the sheet including three flaps foldable about three respective end fold lines around three respective corresponding edges of the first section for connection to the second surface of the first section, said apparatus comprising in combination:

a. aligning means for aligning the envelope on a rigid support after the envelope has been folded about the center fold line and after a floppy disc has been placed between sections of the liner attached to the first and second sections of the flexible plastic sheet, and first section of the flexible plastic sheet being positioned against the rigid support;

b. a rigid stop for limiting movement of material of the envelope adjacent to a first one of the end fold lines;

c. first means for engaging an outer edge of a first one of the flaps and moving the outer edge of the first flap along a variable radius arcuate path over the second surface of the second section of the sheet, the arcuate path having curvature such that the material adjacent to the first end fold line is gathered or bunched up against said rigid stop and then is bent about the first end fold line around one of the corresponding edges of the first section, so that the flexible plastic of the first flap near the first end fold line is forced against the rigid stop, the curvature of said variable radius arcuate path being selected to control the radius of curvature of a fold being formed along the first end fold line;

d. pressing means for pressing the first flap against the second surface of the first section of the sheet and the rigid stop to decrease the radius of the fold being formed along the first fold line, causing the elastic limit of the flexible plastic along the first fold line to be exceeded, thereby producing a permanent fold along the first fold line; and e. a resilient pad having an edge abutting the rigid stop, the curvature of the arcuate path being such that the material near the first fold line is forced against both the rigid stop and the resilient pad, the thickness and resiliency of said resilient pad being selected to control the radius of curvature of the fold along the first fold line.

2. Apparatus for making a floppy disc envelope from a sheet of flexible plastic, the sheet having first and second opposed surfaces, first and second sections on opposed sides of a center fold line, first and second floppy disc drive holes which are aligned when the sheet is folded, a plurality of slots for permitting a magnetic head to contact an enclosed floppy disc, and a liner attached to the first surface of the sheet, the second section of the sheet including three flaps foldable about three respective end fold lines around three respective corresponding edges of the first section for connection to the second surface of the first section, said apparatus comprising in combination:

a. aligning means for aligning the envelope on a rigid support after after the envelope has been folded about the center fold line and after a floppy disc has been placed between sections of the liner attached to the first and second sections of the flexible plastic sheet, the first section of the flexible plastic sheet being positioned against the rigid support;

b. a rigid stop;

c. first means for engaging an outer edge of a first one of the flaps and moving the outer edge of the first flap along an arcuate path over the second surface of the second section of the sheet, the arcuate path having curvature such that the first flap is bent about a first one of the end fold lines around one of the first corresponding edges of the first section, so that the flexible plastic of the first flap near the first end fold line is forced against the rigid stop; and d. second means for pressing the first flap against the second surface of the first section of the sheet and the rigid stop to decrease the radius of a fold being formed along the first fold line, causing the elastic limit of the flexible plastic along the first fold line to be exceeded, thereby producing a permanent fold along the first fold line, wherein said first means and said second means are included in a four bar linkage system, said four bar linkage system including i. a fold bar having first and second ends and first and second opposed edges, said fold bar including means adjacent the second edge of said fold bar for engaging the outer edge of one of the flaps of the sheet of flexible plastic, ii. a first upper link member having first and second ends, the first end of said upper link member being pivotally connected to the first end of the fold bar adjacent the second edge thereof, iii. a first lower link member having first and second ends and first and second opposed edges, the first end of the lower link member being pivotally connected to the first end of said fold bar adjacent the second edge thereof, and iv. third means pivotally connecting the second ends of said upper and lower link members to first and second fixed positions, respectively, the location of said first and second fixed points being selected to produce said arcuate path, said apparatus further including a resilient pad having an edge abutting the rigid stop, the curvature of the arcuate path being such that the material near the first fold line is forced against both the rigid stop and the resilient pad, the thickness and resiliency of said resilient pad being selected to control the radius of curvature of the fold along the first fold line.

3. The apparatus of claim 2 further including second upper and lower link members pivotally attached to the second end of said fold bar.

4. The apparatus of claim 2 wherein said third means includes a slotted plate having a slanted upper slot and means positionally adjustable in said slanted slot for pivotally connecting the second end of said first upper link member to said third means, whereby the location of said first fixed point is adjustable to control the curvature of said arcuate path.

5. The apparatus of claim 2 wherein said third means includes a slotted plate having an approximately horizontal lower slot and means positionally adjustable in said approximately horizontal lower slot for pivotally connecting the second end of said lower link member to said third means, whereby the location of said second fixed point is adjustable to control the curvature of said arcuate path.

6. The apparatus of claim 2 further including means connected to said fold bar for rotating said fold bar, said four bar linkage system causing said edge engaging means to travel along said arcuate path in response to said rotation of said fold bar.

7. The apparatus of claim 2 wherein said fold bar includes a recess into which said rigid stop extends to prevent said rigid stop from touching said fold bar during said moving of the outer edge of the first flap along said arcuate path.

8. The apparatus of claim 2 further including retaining means connected to said fold bar for preventing the first corresponding edge from moving closer to the outer edge of the first flap than a distance approximately equal to the width of the first flap during said moving of the outer edge of the first flap along said arcuate path.

9. The apparatus of claim 2 further including a resilient pad having an edge abutting the rigid stop, the curvature of the arcuate path being such that the material near the first fold line is forced against both the rigid stop and the resilient pad.

10. The apparatus of claim 9 wherein the thickness and resiliency of said resilient pad is selected to control the radius of curvature of the fold along the first fold line.

* * * * *